UNITED STATES PATENT OFFICE.

HEINRICH KRIEGSHEIM, OF NEW YORK, N. Y., ASSIGNOR TO THE PERMUTIT COMPANY, U. S. A., OF NEW YORK, N. Y., A CORPORATION OF DELAWARE.

PROCESS OF TREATING BOILER-WATER.

1,235,815.

Specification of Letters Patent. Patented Aug. 7, 1917.

No Drawing. Application filed April 22, 1915. Serial No. 23,077.

*To all whom it may concern:*

Be it known that I, HEINRICH KRIEGSHEIM, a citizen of Germany, residing at New York, in the county of New York and State of New York, have invented certain new and useful Improvements in Processes of Treating Boiler-Water, of which the following is a specification.

This invention relates to processes of treating boiler water; and it comprises a method of operating boilers supplied with soft waters free or substantially free from scale forming substances and also low in saline constituents wherein such water receives an addition of certain saline bodies in amount sufficient to prevent substantial attack upon iron, such method being particularly adapted to the treatment of water to be supplied to a boiler through preheating elements; all as more fully hereinafter set forth and as claimed.

Ordinary water usually contains in addition to easily soluble compounds of the alkali metals greater or less amounts of difficultly soluble scale-forming substances, the so-called hardness-formers or salts of the alkaline earths, lime and magnesia. On heating, as in a boiler, these lime and magnesia compounds separate out and form scale which prevents heat transmission but on the other hand prevents corrosion by gases dissolved in the water. When the water is softened, or is naturally soft, this prevention of corrosion by formation of a protective coating no longer occurs; and corrosion is a serious problem. Many attempts have been made to obviate it, as by additions of small quantities of hardness-producing bodies, by painting piping and boiler walls, etc., but with little success. Thin layers of scale peel off with temperature changes, or when the boiler goes out of use; and paints do not well withstand boiler temperatures.

Corrosion is particularly serious in plants using condensed water as such water is naturally extremely soft and pure. In plants using steam condensers, in heating installations, etc., the action of condensed water in any event is especially serious upon preheaters, piping, etc.

Condensed water and the feed water entering economizers have a temperature which is critical in regard to its attacking power upon iron. Distilled water for instance during five tests, made under the same conditions for 22 days, at the temperatures mentioned below dissolved the quantities of iron indicated in column I. Similar tests made at the same time, with the exception that the test temperatures were kept only for 7 hours and that the rest of each day the temperature was that of the room, gave the results in column II.

| Temperature. | I. | II. |
|---|---|---|
|  | *Grams.* | *Grams.* |
| 20° C | 0.075 | 0.075 |
| 40° C | 0.175 | 0.120 |
| 60° C | 0.240 | 0.200 |
| 80° C | 0.200 | 0.250 |
| 100° C | 0.075 | 0.075 |

These results show that the temperatures at which condensed water and boiler feed water are usually supplied to the heating elements in advance of the boiler are critical.

While the chemical nature of the attack of pure soft water upon iron and steel is not well understood, the attack is proportional in large measure to the amount of dissolved oxygen. Dissolved oxygen of course occurs in all water exposed to the air and freshly condensed water takes it up rapidly on such exposure. But the attack also depends in large measure upon the nature of the dissolved solids contained in the water; and upon their quantity and nature. With most salts the presence of a small amount of salt facilitates corrosion while more impedes it; there being a certain critical amount of concentration beyond which corrosion decreases rapidly. With some salts, corrosion does not entirely cease beyond this point; while with others it does. With common salt, NaCl, corrosion is at a maximum with a concentration of about 1 per cent. and with higher concentrations it diminishes but does not cease altogether. With carbonate of soda corrosion increases up to a concentration of 0.1 per cent. and at a concentration of 1 per cent. it practically ceases altogether.

Among the salts which possess this property of annulling corrosion when their concentration exceeds a certain value may be listed salts of alkaline reaction, such as sodium acetate, potassium cyanid, calcium hydrate, potassium ferricyanid and ferrocyanid, barium hydrate, sodium hydrate, sodium borate, disodium phosphate, sodium bicarbonate, potassium carbonate, and sodium carbonate. These salts are listed in the order of their activity, sodium acetate for instance restraining corrosion in much smaller concentrations than does sodium carbonate. Other salts which have the power of restraining corrosion are those of oxidizing nature, such as chromic acid, potassium bichromate, potassium chromate, potassium iodate, potassium bromate, potassium permanganate and potassium chlorate. Potassium iodate, bromate and chlorate however are not absolute in their action; they do not entirely prevent corrosion.

The strongest corrosion preventing material is chromic acid of which 0.001 per cent. prevents rusting. But alkaline salts, such as sodium acetate and sodium carbonate, though not so active are much more convenient for use. Dilute solutions of sodium carbonate, that is solutions weaker than the critical concentration, attach iron about in the same rate as distilled water.

In case of sodium carbonate, which is a convenient salt for the present purposes, the presence of 0.1 per cent. in the water at room temperature is still insufficient to prevent corrosions while higher quantities annul corrosion.

But sodium carbonate dissociates in solution under high pressure (more than 2 atmospheres) and at corresponding steam temperature into sodium hydrate and carbonic acid. Sodium hydrate is still more effective than sodium carbonate. High temperature also reduces the critical concentration. Accordingly boiler salines are considered to be harmless when the concentration of the alkali salts (carbonates and hydrates) in the boilers is about 0.1 per cent. or more.

In the present invention I take advantage of the recited facts by maintaining in boiler feed water a concentration of these anticorrosive salts above the critical value.

In the case of boilers with a constant feed of naturally soft or artificially softened waters, the saline concentration in the boiler proper of course soon becomes relatively high and water must be vented from time to time. This concentrated saline solution in the boiler may or may not contain the corrosion-annulling salts; but in any event its corrosive power is less than that of the raw water. Therefore in one embodiment of my invention I supply a certain amount of such concentrated liquid from the boiler itself to the raw water prior to the entry of such water to the preheaters, tubing and other corrodible elements between the boiler proper and the source of water supply. Advantageously however, I supply a certain amount of salts having the specific anti-corrosion action stated to the feed water prior to entering the system. These salts accumulate in the boiler and may be thence returned to the feed water.

The present invention is particularly advantageous in treating condensation water which is to be sent back to the boiler through preheaters or fuel economizers.

In many waters which are artificially softened, as by the use of base exchanging zeolities, by soda, by lime and soda, etc., the water already contains salts of alkaline nature; but the amount is often not high enough to restrain corrosion. With the use of water of this class the return of concentrated liquor from the boiler to inflowing softened water is particularly advantageous. In a specific embodiment of the present invention using a soft water in a plant and using condensation, I treat the water with an amount of sodium carbonate which will maintain the concentration of the liquid in the boiler somewhere above 0.1 per cent.; but in consideration of other circumstances not above 2½ to 3 per cent. and I steadily return a portion of the hot concentrated liquid from the boiler to the inflowing water prior to its entering the preheating or fuel economizer system. The ratio between the amount of liquid which is vented from the boiler from time to time and that which is supplied to the inflowing water should be such as to maintain a concentration of about 0.1 per cent. alkalinity in the inflowing water. As the water from the boiler is supplied to the inflowing liquid hot, no loss of heat is experienced, and the mean temperature of the water flowing through the preheater elements is raised above that of maximum corrosion. To prevent loss of power, the mixture of returned water and inflowing water can of course be performed under pressure.

What I claim is:—

1. In the operation of boilers, the process which comprises establishing a relatively high concentration of a corrosion-preventing dissolved salt in the body of water therein, feeding water thereto and returning a portion of the liquid from the boiler to the feed water prior to contact of such feed water in a hot condition with metal parts.

2. In the operation of a boiler and feed water heater the process which comprises establishing a relatively high concentration of corrosion-preventing salt in the water in such boiler, feeding water through such feed water heater to such boiler and constantly returning a portion of the liquid from the boiler and admixing with such water prior to its entry into the feed water heater.

3. In the operation of boilers with artificially softened or naturally soft water, the process which comprises admixing such water with hot concentrated liquid from the boiler prior to its entry into such boiler and boiler accessories.

4. In the operation of boilers with artificially softened water containing alkali salts, the process which comprises admixing water from the boiler with the feed water prior to its contact with heated metal elements, the amount of such water so admixed with the feed water being sufficient to maintain the total concentration of alkaline materials in the mixture at a point in excess of that corresponding to one tenth per cent. of sodium carbonate.

In testimony whereof, I affix my signature in the presence of two subscribing witnesses.

HEINRICH KRIEGSHEIM.

Witnesses:
 MAURICE P. STACK,
 F. B. WIELAND.